United States Patent
Hsieh

(10) Patent No.: US 10,179,396 B2
(45) Date of Patent: *Jan. 15, 2019

(54) TORQUE-CORRECTABLE TORQUE WRENCH AND TORQUE CORRECTION METHOD THEREOF

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 244 days.

This patent is subject to a terminal disclaimer.

(21) Appl. No.: 15/379,413

(22) Filed: Dec. 14, 2016

(65) Prior Publication Data
US 2017/0095911 A1 Apr. 6, 2017

Related U.S. Application Data

(63) Continuation-in-part of application No. 14/280,073, filed on May 16, 2014, now Pat. No. 9,561,583.

(51) Int. Cl.
*G01L 25/00* (2006.01)
*B25B 23/142* (2006.01)

(52) U.S. Cl.
CPC ...... *B25B 23/1427* (2013.01); *B25B 23/1425* (2013.01); *G01L 25/003* (2013.01)

(58) Field of Classification Search
CPC .............. B25B 23/142; B25B 23/1422; B25B 23/1425; B25B 23/1427; G01L 5/0042; G01L 25/003; Y01T 29/49766
See application file for complete search history.

(56) References Cited

U.S. PATENT DOCUMENTS

| | | | | |
|---|---|---|---|---|
| 3,355,970 A * | 12/1967 | Knudsen | ............ | B25B 23/1427 81/478 |
| 7,631,583 B2 * | 12/2009 | Hsieh | ............ | B25B 23/1425 81/467 |
| 7,942,085 B2 * | 5/2011 | Hsieh | ............ | B25B 13/463 81/477 |
| 8,485,075 B1 * | 7/2013 | Gauthier | ............ | B25B 23/1425 81/177.5 |
| 2005/0155469 A1 * | 7/2005 | Li | ............ | B25B 23/1425 81/479 |
| 2007/0039432 A1 * | 2/2007 | Cutler | ............ | B25B 23/1425 81/478 |

(Continued)

*Primary Examiner* — Peter J Macchiarolo
*Assistant Examiner* — Nathaniel J Kolb
(74) *Attorney, Agent, or Firm* — Guice Patents PLLC

(57) ABSTRACT

A torque wrench includes a mechanical structure and an electronic structure. The mechanical structure includes a tubular body, a flexible rod, an abutment member, an elastic member, a trip mechanism, an adjustment mechanism and a mechanical scale indication mounted in the tubular body for indicating the set torque of the wrench. The electronic structure includes at least one torque sensor and a display unit. When correcting the torque value of the mechanical structure, a force is applied to the wrench and the torque sensor detects the trip torque value of the wrench. The torque value of the mechanical structure is adjusted to match the torque value detected by the torque sensor so as to eliminate the error of the torque value of the mechanical structure.

13 Claims, 16 Drawing Sheets

(56) References Cited

U.S. PATENT DOCUMENTS

| | | | | |
|---|---|---|---|---|
| 2009/0120247 A1* | 5/2009 | Hsieh | ............... | B25B 23/1422 81/467 |
| 2010/0147118 A1* | 6/2010 | Hsieh | ................. | B25B 13/463 81/477 |
| 2012/0132042 A1* | 5/2012 | Bruce | ............... | B25B 23/1425 81/479 |
| 2012/0240735 A1* | 9/2012 | Tsai | .................. | B25B 23/1425 81/479 |

* cited by examiner

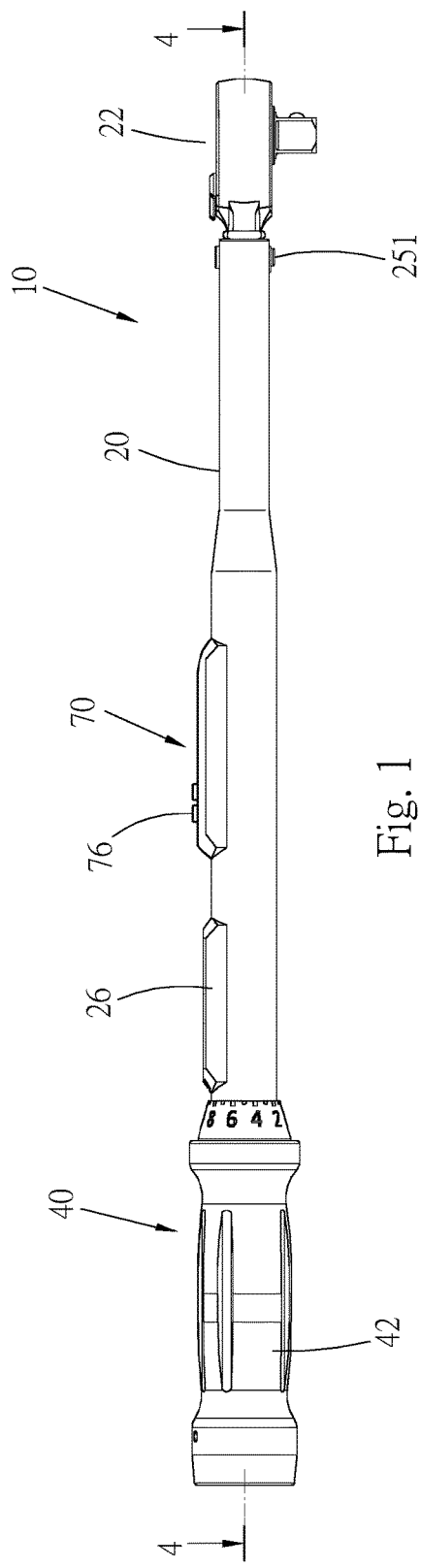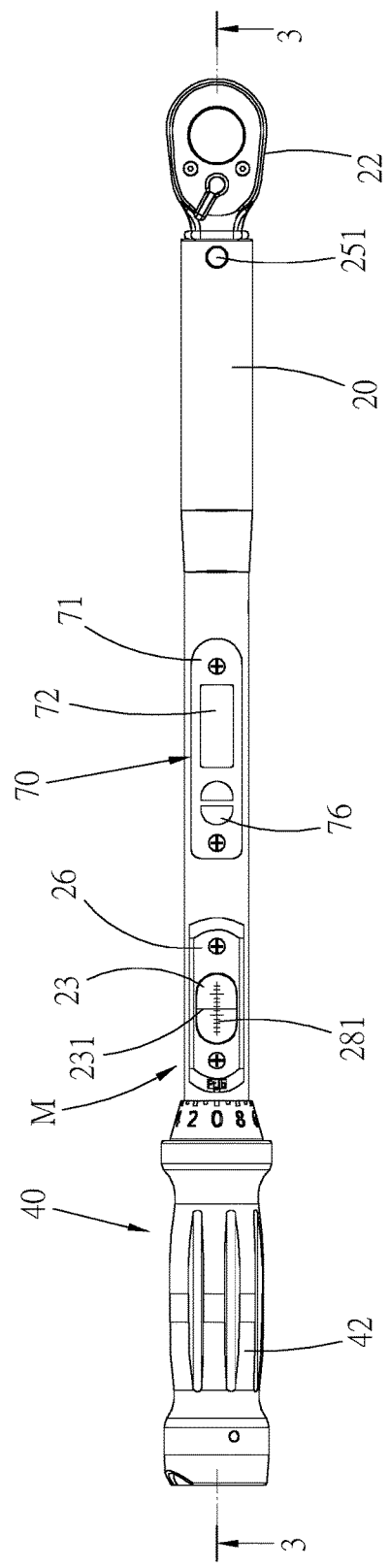

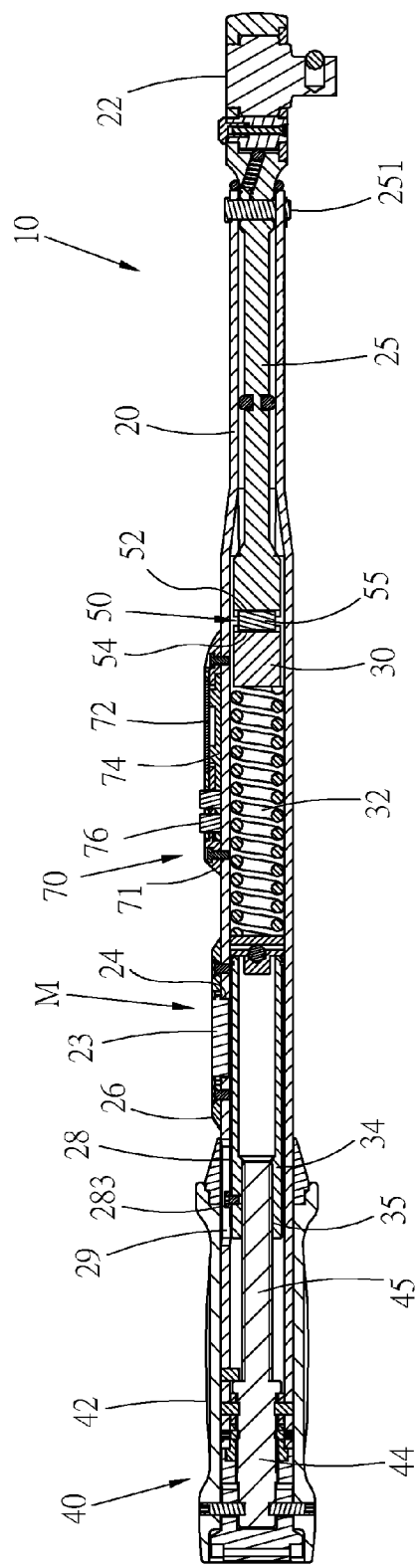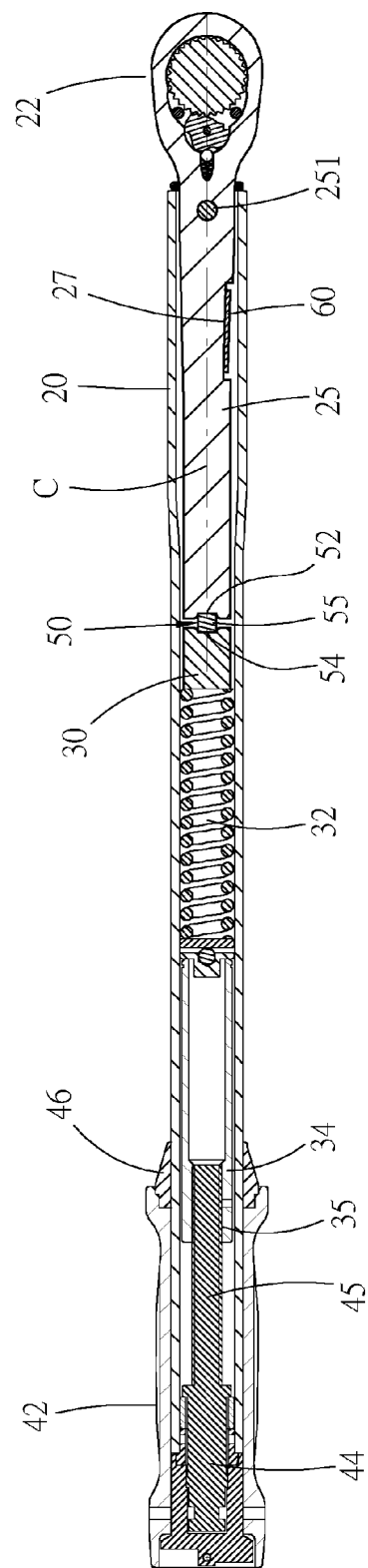
Fig. 3
Fig. 4

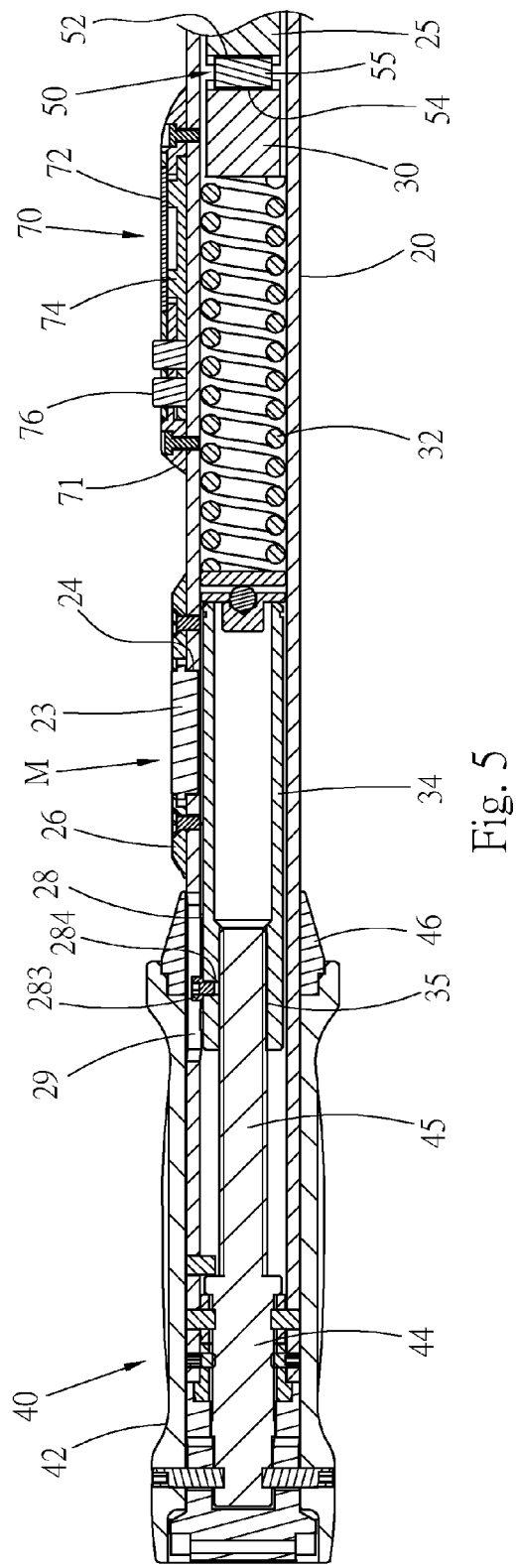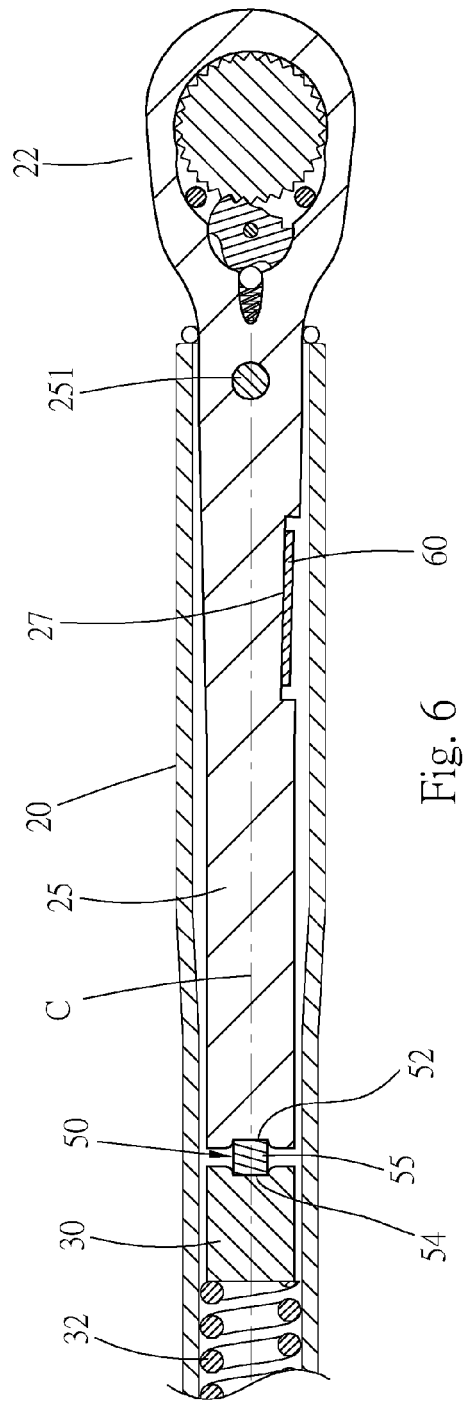
Fig. 5
Fig. 6

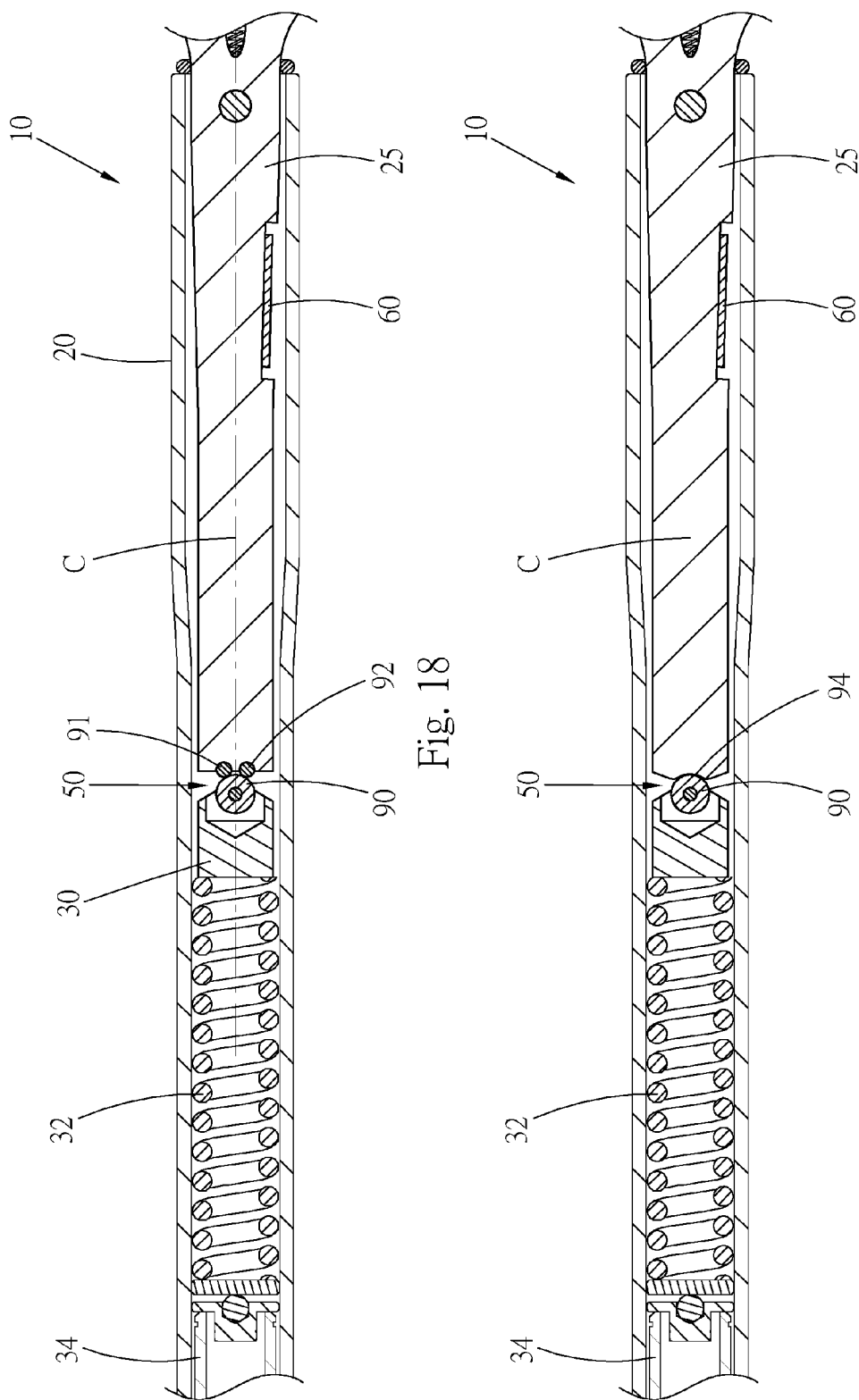

TORQUE-CORRECTABLE TORQUE WRENCH AND TORQUE CORRECTION METHOD THEREOF

This application is a Continuation-in-Part of application Ser. No. 14/280,073, entitled TORQUE WRENCH CAPABLE OF CORRECTING TORQUE AND TORQUE CORRECTION METHOD THEREOF, filed on May 16, 2014.

BACKGROUND OF THE INVENTION

1. Field of the Invention

The present invention relates generally to a torque wrench, and more particularly to a torque wrench capable of correcting torque and a torque correction method of the torque wrench.

2. Description of the Related Art

A conventional torque wrench is settable in torque value. When the application force of the wrench reaches a set torque value, an alert effect is provided. The mechanical torque wrench has a trip mechanism. An elastic member abuts against the trip mechanism. The wrench further has an adjustment mechanism for changing the elastic force applied by the elastic member to the trip mechanism. The handle of the wrench is formed with a window with scales for indicating the set torque value of the wrench. In use, the wrench is forced to a bolt or a nut. When the application force of the wrench exceeds the set torque value, the trip mechanism trips to shock the wrench and emit a sound to immediately alert a user that the application force of the wrench has reached the set value.

After a long period of use, the trip mechanism of the wrench will be apparently worn. In this case, the set torque value of the wrench is not the true trip torque value of the wrench. That is, there is an error between the set torque value and the true trip torque value. For example, the set torque value of the wrench is 2 N·m, while the true trip torque value of the wrench is only 1.6 N·m. In this case, actually, the bolt or the nut is not tightened by a necessary torque. This will threaten the security of mechanical equipment or a building.

In case of error of the torque value of the mechanical torque wrench, it is necessary for a user to send the wrench back to the manufacturer or the retailer to replace the parts or correct the torque value. The user himself/herself cannot correct the torque value.

SUMMARY OF THE INVENTION

It is therefore a primary object of the present invention to provide a torque wrench designed with a torque correction structure for a user himself/herself to correct the mechanical torque value of the wrench.

It is a further object of the present invention to provide a torque wrench capable of correcting mechanical torque value and a torque correction method of the torque wrench. The torque wrench is a torque wrench with both a mechanical torque mechanism and an electronic torque sensation mechanism. The object of the present invention is that the torque wrench is such designed that the mechanical torque value of the mechanical torque display assembly is correctable by the electronic torque sensation mechanism.

A torque-correctable torque wrench comprising:

a tubular body;

an operation head positioned at a front end of the tubular body;

a mechanical torque mechanism disposed on the tubular body, the mechanical torque mechanism having a mechanical torque display assembly, the mechanical torque display assembly serving to show the mechanical torque value of the torque wrench by means of scales and indication mark; and an electronic torque sensation mechanism disposed on the tubular body, the electronic torque sensation mechanism having an electronic display screen for showing the electronic torque value of the torque wrench, the read values of the scales of the mechanical torque display assembly being adjustable in a longitudinal direction of the tubular body.

Accordingly, the wrench has a mechanical torque structure and electronic torque components, the error of the mechanical torque value of the mechanical torque mechanism can be corrected by the electronic torque sensation mechanism.

A torque correction method of the torque-correctable torque wrench as claimed in claim 1, wherein the wrench has the mechanical torque mechanism and the electronic torque sensation mechanism, the correction method comprising steps of:

checking and measuring, the errors of the mechanical torque value of the mechanical torque mechanism and the electronic torque value of the electronic torque sensation mechanism being checked and measured; and correcting, the read value of the scale of the mechanical torque display assembly of the mechanical torque mechanism being adjusted to make the mechanical torque value match the electronic torque value so as to correct the error.

Accordingly, when the torque value of the mechanical torque mechanism is error, by performing the correction process, the electronic torque sensation mechanism precisely detect the true torque value of the wrench to correct the mechanical torque value of the mechanical torque mechanism of the torque wrench. A user can easily perform the torque correction process.

The present invention can be best understood through the following description and accompanying drawings, wherein:

BRIEF DESCRIPTION OF THE DRAWINGS

FIG. 1 is a top view of a first embodiment of the torque wrench of the present invention;

FIG. 2 is a side view of the first embodiment of the torque wrench of the present invention;

FIG. 3 is a sectional view taken along line 3-3 of FIG. 2;

FIG. 4 is a sectional view taken along line 4-4 of FIG. 1;

FIG. 5 is an enlarged view of a part of FIG. 3;

FIG. 6 is an enlarged view of a part of FIG. 4;

FIG. 18 is a sectional view of a part of a sixth embodiment of the wrench of the present invention;

FIG. 19 is a sectional view of a part of a seventh embodiment of the wrench of the present invention.

DETAILED DESCRIPTION OF THE PREFERRED EMBODIMENTS

Figure 7:
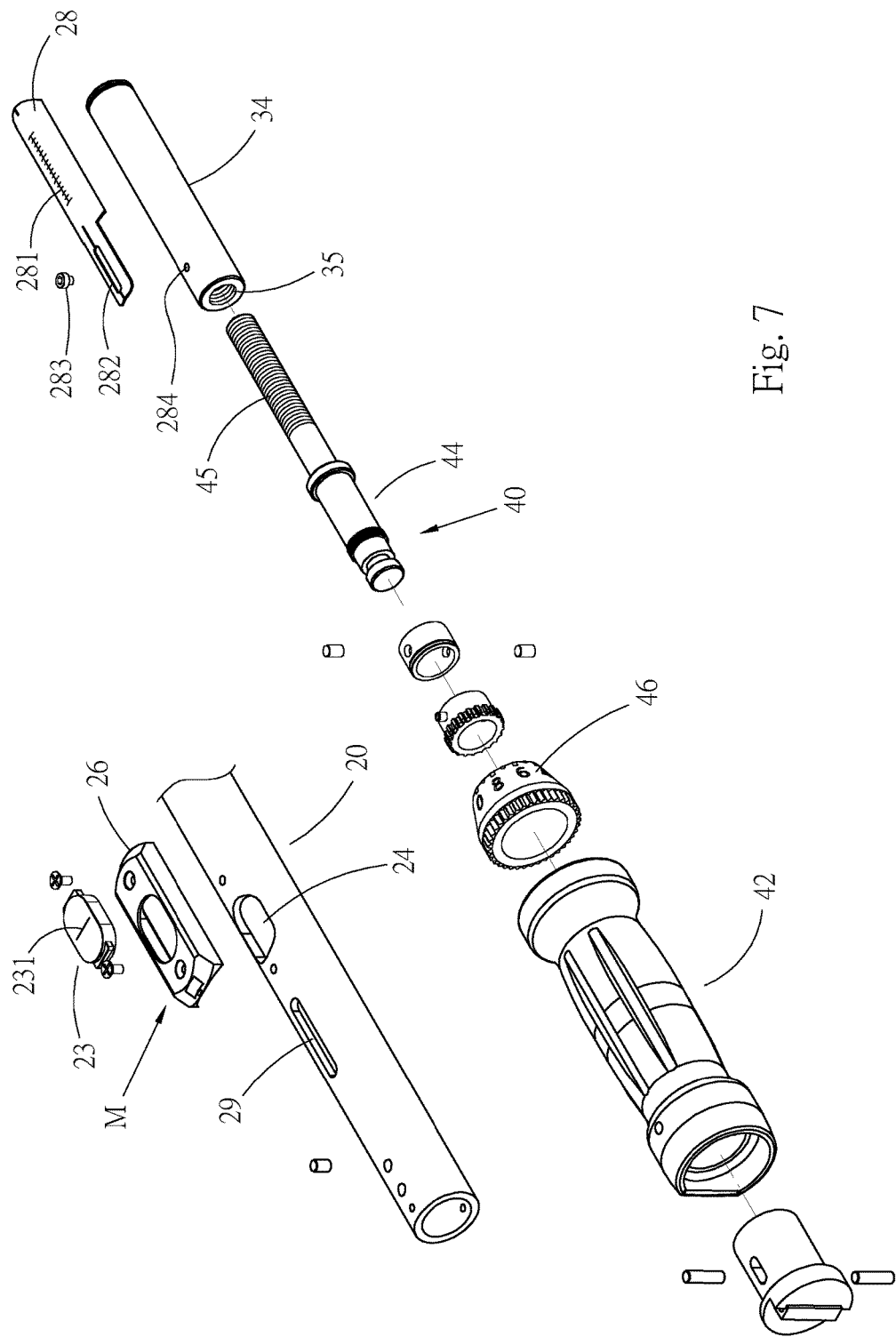
FIG. 7 is a perspective partially exploded view of the first embodiment of the torque wrench of the present invention.

Please refer to FIGS. 1 to 4. According to a first embodiment, the torque wrench 10 of the present invention is a torque wrench with both a mechanical torque mechanism (such as, but no limit to, a click mechanism) and an electronic torque sensation mechanism. The mechanical torque mechanism has a mechanical torque display assembly M. The electronic torque sensation mechanism has an electronic display unit. The mechanical torque display assembly and the electronic display unit can both show the torque value of the wrench. The object of the present invention is to use the electronic torque sensation mechanism of the wrench to correct the torque value of the mechanical torque display assembly.

The structure of the wrench is described hereinafter. Please refer to FIGS. 3 to 5. The wrench 10 has a tubular body 20 and an operation head 22 positioned at a front end of the tubular body 20. The operation head 22 can have the form of an open wrench or a ratchet wrench and is not limited to the structure of this embodiment. The operation head 22 of the wrench 10 is used to wrench a threaded member (such as a bolt or a nut) or a socket. A flexible rod 25, which is a left and right symmetrical rod body, is pivotally disposed at the front end of the tubular body 20 via a pivot pin 251. The flexible rod 25 is swingable around the pivot pin 251. A rear end of the flexible rod 25 is positioned in the tubular body 20. A front end of the flexible rod 25 is fixedly connected with the operation head 22. The flexible rod 25 is a part of the operation head 22.

The mechanical torque mechanism is disposed on the tubular body 20. The mechanical torque display assembly M serves to show the torque value of the mechanical torque mechanism of the wrench. The mechanical torque mechanism includes an abutment member 30, an elastic member 32 (compression spring) and a slide member 34, which are rearward sequentially arranged in the tubular body 20. The abutment member 30 is positioned behind the flexible rod 25 and slidable within the tubular body 20. The slide member 34 is slidable within the tubular body 20 without possibility of rotation. The slide member is formed with an internal threaded hole 35. The elastic member 32 is positioned between the abutment member 30 and the slide member 34. A front end and a rear end of the elastic member 32 respectively elastically abut against the abutment member 30 and the slide member 34. The mechanical torque mechanism is not limited to the embodiment of the present invention.

The mechanical torque mechanism further comprises an adjustment mechanism 40, the adjustment mechanism 40 includes the slide member 34, a handle 42 fitted around the rear end of the tubular body 20 and an adjustment member 44 disposed in the tubular body 20. The adjustment member 44 is rotatable within the tubular body 20 without possibility of displacement. A rear end of the adjustment member 44 is directly connected with the handle 42 or indirectly connected with the handle 42 via another component. A front end of the adjustment member 44 is a threaded rod section 45 screwed in the threaded hole 35 of the slide member 34. When rotating the handle 42, the adjustment member 44 is rotated along with the handle 42, whereby the threaded rod section 45 drives the slide member 34 to back and forth slide along the tubular body 20 so as to adjust the slide member 34 to different positions. Accordingly, the elastic force applied by the elastic member 32 to the abutment member 30 is adjustable so as to adjust the mechanical torque of the wrench. The handle 42 can be taken off from the rear end of the tubular body 20 and disconnected from the adjustment member 44. An end collar 46 is detachably fitted with the front end of the handle 42 and is rotatable along with the handle. A circumference of the end collar 46 is marked with scales.

Please now refer to FIG. 6. The mechanical torque mechanism further comprises a trip mechanism (click mechanism) 50, which is disposed between the rear end of the flexible rod 25 and the abutment member 30. When the application force of the wrench exceeds a set torque, the trip mechanism provides a trip effect. The trip mechanism 50 can have different forms. In this embodiment, the trip mechanism 50 is substantially connected with the operation head and includes a first recess 52 formed at the rear end of the flexible rod 25, a second recess 54 formed at the front end of the abutment member 30 and an abutment block 55 in the form of a rectangular solid or a cuboid. The abutment block 55 is in contact with the two recesses 52, 54. The width of the two recesses 52, 54 is equal to or slightly larger than the width of the abutment block 55. The elastic member 32 applies an elastic force to the abutment member 30, whereby the abutment block 55 is elastically held by the abutment member 30 and the flexible rod 25.

In normal state, the two recesses 52, 54 of the trip mechanism 50 are right aligned with each other and the front and rear end faces of the abutment block 55 respectively contact the two recesses.

Please refer to FIGS. 5 and 7. In this embodiment, the mechanical torque display assembly is a mechanical scale indication assembly. The scale indication assembly includes an indication mark 231 and scales 281 in cooperation with each other. To speak more specifically, a window 24 is formed on a top face of the tubular body 20. A indicator 23 is mounted in the window 24. A mark 231 is disposed on the surface of the indicator 23. A cover body 26 is detachably fixed on the outer circumference of the tubular body 20 by means of two small screws 261; the indicator 23 is secured by the cover body 26. A scale member, which is a scale plate 28, scales 281 are printed on the surface of the scale plate 28. The scale plate 28 is formed with a longitudinal slot 282. A connection member 283, which is a small screw, is passed through the slot 282 and is screwed with a screw hole 284 on the slide member 34 to detachably fix the scale plate 28 on the circumference of the slide member 34, whereby the scale plate 28 is positioned below the window 24 and movable along with the slide member 34. Please refer to FIG. 2, the indicator is preferably transparent or semi-transparent, a user can see the scales 281 of the scale plate through the indicator 23 so as to know the value of the set torque of the wrench. The tubular body 20 has a hollow section. The small screw 283 corresponds to the hollow section. In this embodiment, the hollow section is a longitudinal slot 29 formed on the tubular body 20, the screw 283 is received in the longitudinal slot 29. By means of the small screw 283 restrained in the longitudinal slot 29, the slide member 34 can only slide within the tubular body 20 without possibility of rotation. It should be noted that there are other ways to have the slide member slidable in the tubular body without rotation.

In addition to the above mentioned mechanical torque mechanism, the wrench of the present invention further has the electronic torque sensation mechanism for correcting the mechanical torque value of the wrench. The electronic torque sensation mechanism is described as following. Please refer to FIG. 6. At least one side of the flexible rod 25 is formed with a recess 27. At least one torque sensor 60 such as a tension gauge or a strain gauge is disposed in the recess 27 of the flexible rod 25 for detecting the strain of the flexible rod.

Please refer to FIG. 2, said electronic display unit such as an electronic display panel 72 of a liquid crystal screen is disposed on the circumference of the tubular body 20. The display unit is electrically connected to the torque sensor 60. The electronic torque value detected by the torque sensor can be displayed on the display panel 72. Please refer to FIG. 5, the electronic torque sensation mechanism comprises an electronic assembly 70, the electronic assembly 70 is mounted on the tubular body 20, including a housing 71, the electronic display panel 72, a circuit unit (such as a circuit board 74 with printed circuits) and at least one pushbutton 76. In this embodiment, there are two pushbuttons. The housing 71 is fixedly disposed on the tubular body 20. The electronic display panel 72, the circuit board 74 and the two pushbuttons 76 are disposed in the housing 71. The display panel 72 and the two pushbuttons 76 are electrically connected to the circuit board 74. The torque sensor 60 is also electrically connected to the circuit board 74. By means of the operation of the circuit unit, the torque value detected by the sensor 60 can be displayed on the display panel 72. The two pushbuttons 76 can execute several use functions such as, but not limited to, powering on/off, numeral input, selection, setting and storage.

Figure 8:
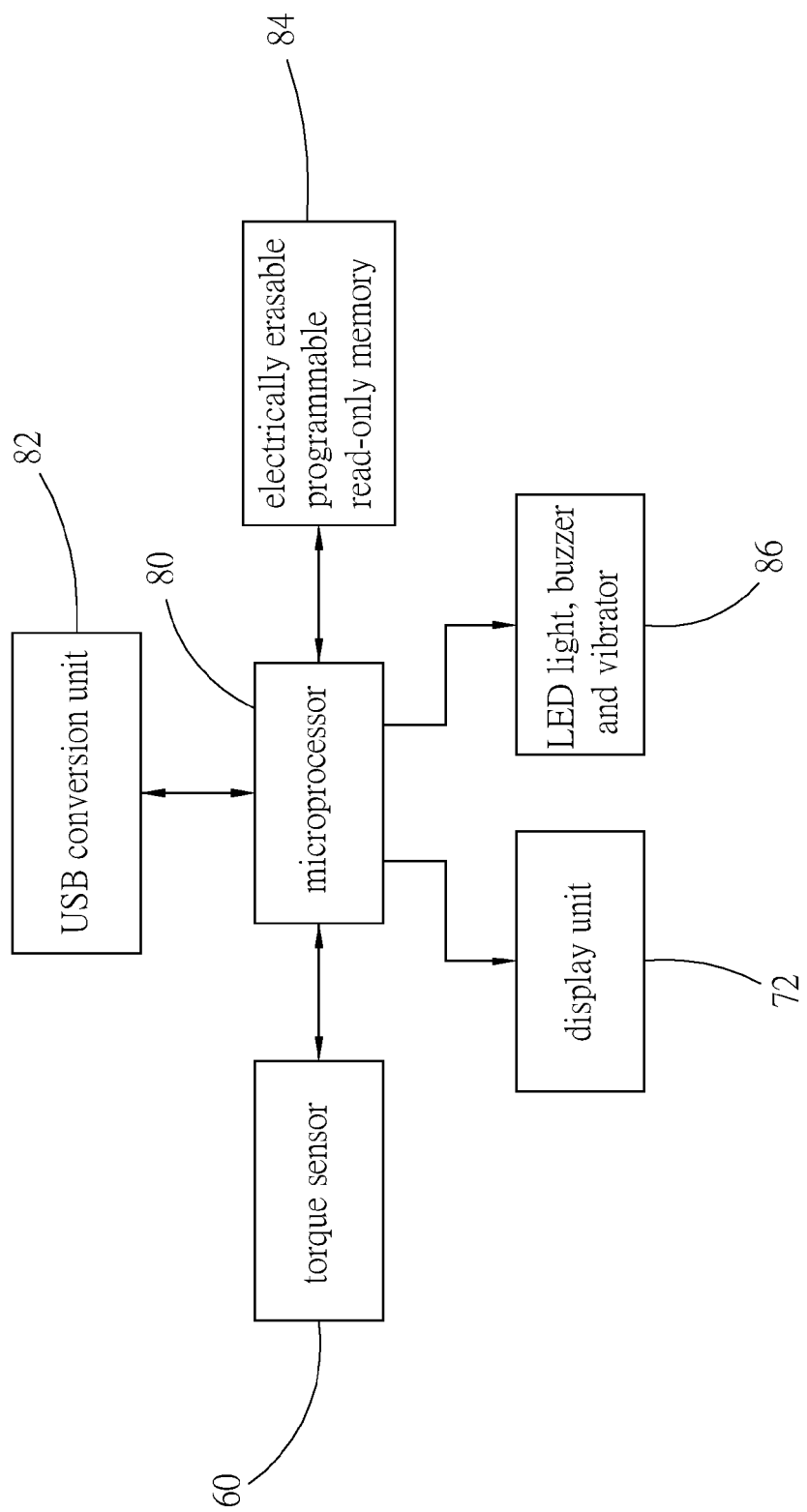
FIG. 8 is a circuit diagram of the first embodiment of the torque wrench of the present invention.

Please refer to FIG. 8. The circuit structure of the electronic assembly 70 includes a microprocessor 80, a USB conversion unit 82 electrically connected to the microprocessor 80, an electrically erasable programmable read-only memory (EEPROM) 84 and the torque sensor 60 and the display unit 72. At least one LED light, a buzzer and a vibrator 86 can be further disposed. In addition, a power supply is disposed on the wrench in a proper position for electronic assembly 70.

In use of the wrench 10 of the present invention, the mechanical structure of the wrench is a mainly used part for judging whether the torque has reached the set torque value. As aforesaid, when a user desires to set the torque of the wrench, by means of the adjustment mechanism 40, the slide member 34 is driven to slide so as to change the elastic energy of the elastic member 32. When the elastic member 32 abuts against the abutment member 30 by a greater elastic force, the wrench is set with a higher torque. In this case, it is necessary to apply a greater action force to the trip mechanism 50 to trip the trip mechanism 50. Reversely, when the elastic member 32 abuts against the abutment member 30 by a smaller elastic force, the wrench is set with a lower torque. The user can know the set torque value from the scale 281 of the scale plate 28 indicated by the indication mark 231 of the indicator 23. This torque value is a mechanical torque value provided by the mechanical torque display assembly M.

Figure 9:
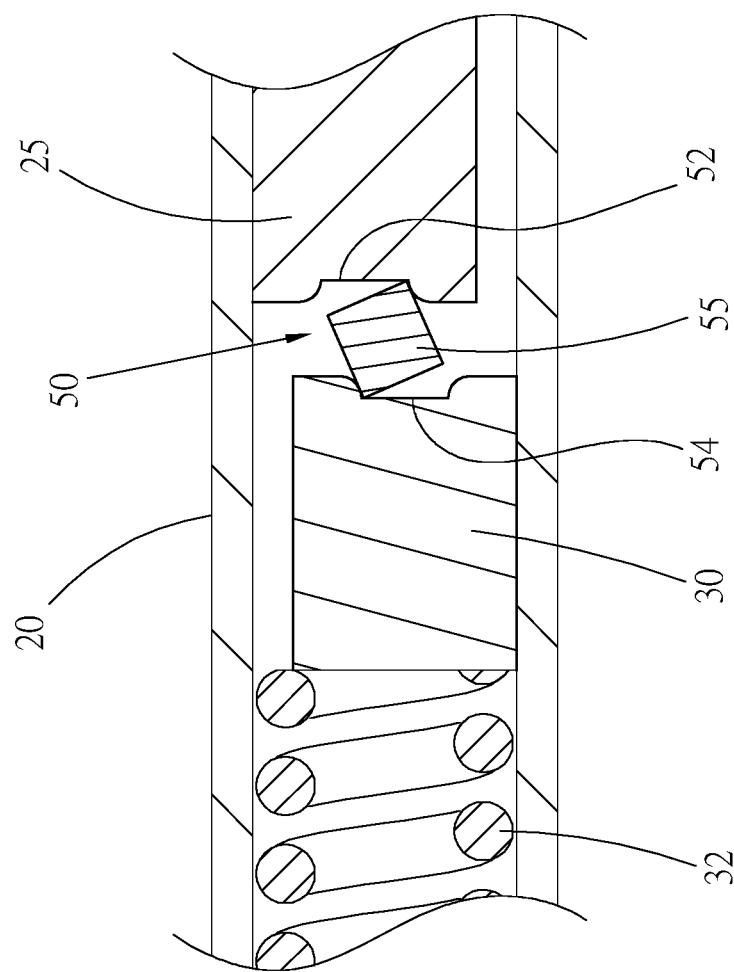
FIG. 9 is a partially sectional view of the first embodiment of the torque wrench of the present invention.

When the force applied by the wrench 10 to a threaded member or a socket for wrenching the same reaches the set torque, the trip mechanism 50 will slip/trip as shown in FIG. 9. At this time, the rear end of the flexible rod 25 and the abutment member 30 are respectively deflected to two sides and the two recesses 52, 54 are misaligned from each other. The abutment block 55 is rotated to contact the two recesses at two corners respectively. When the trip mechanism 50 trips, the wrench will be shocked and a sound is emitted. Through the shock and the sound, the user can easily and quickly judge that the application force of the wrench has reached the set torque. In usual use of the wrench 10, it is unnecessary to power on the electronic structure of the wrench. That is, the sensor 60 is not used to detect whether the torque of the wrench has reached the set value.

After a period of use of the wrench, the trip mechanism 50 will be worn. Under such circumstance, the elastic force applied by the elastic member 32 to the slide member 34 is lowered. This will cause error of the mechanic structure of the wrench. For example, the scale plate 28 indicates that the set torque value of the wrench 10 is 2 N (i.e. the indication mark 231 is marked on the scale 281 of 2 N), but the true torque is only 1.6 N. Under such circumstance, a user can utilize the electronic components of the wrench to correct the error of the mechanical torque display assembly M.

Figure 10:
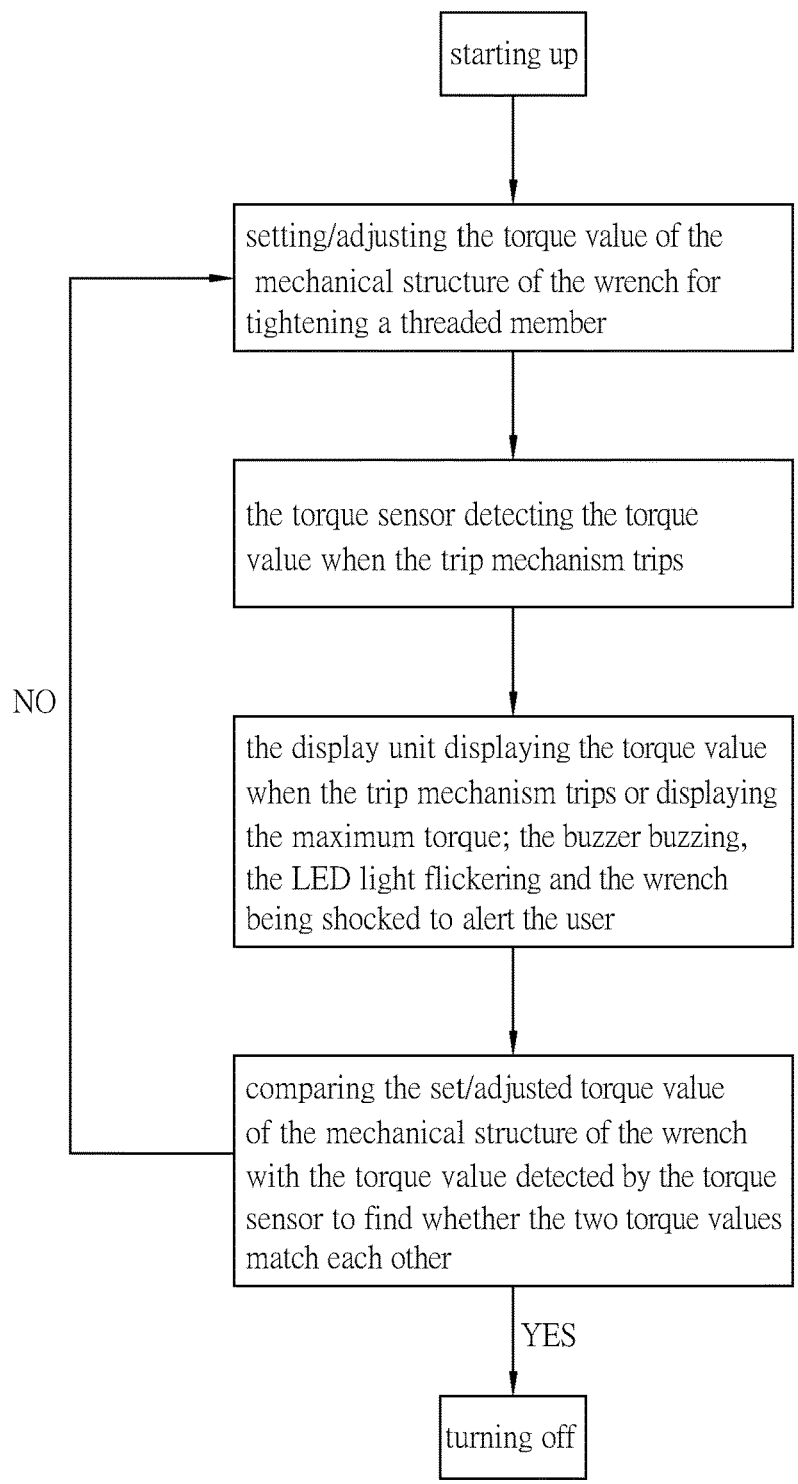
FIG. 10 is a flow chart of the torque correction method of the present invention.

FIG. 10 is a flow chart of the torque correction method of the wrench 10 in which the electronic torque sensation mechanism is used to correct the torque value of the mechanical torque display assembly. The torque correction method of the wrench of the present invention includes steps of:

1. starting up:
    a pushbutton 76 being pressed to power on the electronic assembly 70 for operating the electronic assembly;
2. setting/adjusting the torque value of the mechanical torque mechanism of the wrench for tightening a threaded member:
    the adjustment mechanism 40 being used to set/adjust the torque value of the mechanical torque mechanism of the wrench to a necessary value, the torque value of the mechanical torque mechanism to be set/adjusted being a torque value applied to the wrench when the trip mechanism 50 trips, such as 3 N (indicated by the scale plate);
3. the torque sensor detecting the torque value of the wrench when the trip mechanism trips:
    the wrench 10 being forced to wrench the threaded member, in the wrenching process, the flexible rod 25 being flexed and the torque sensor 60 of the electronic torque sensation mechanism detecting the strain of the flexible rod 25 to real-time detect the torque of the wrench, the wrench being continuously forced until the trip mechanism 50 trips, whereby the sensor 60 can detect the torque value applied to the flexible rod 25 when the trip mechanism 50 trips, which is the true torque value of the wrench, the electronic torque sensor 60 being able to precisely detect the torque value so that the true torque value of the wrench can be detected;
4. the display unit displaying the torque value when the trip mechanism trips or displaying the maximum torque; the buzzer buzzing, the LED light flickering and the wrench being shocked to alert the user:
    when tripping, the torque value corresponding to the strain of the flexible rod 25 detected by the torque sensor 60 being displayed on the display panel 72, the circuit of the electronic assembly 70 being such designed that the torque applied to the wrench when the trip mechanism 50 trips being displayed on the display panel 72 or the maximum torque applied to the wrench prior to the trip being displayed on the display panel, that is, the torque value displayed on the display panel 72 being the maximum torque value of the wrench during the correction process, the present invention recording the peak value of the torque, the recorded value or the value displayed on the display panel being the maximum torque value of the trip mechanism 50 during the correction process, the electronic assembly 70 further including an LED light, a buzzer and a shocking unit, whereby when the trip mechanism trips, the LED light flickers, the buzzer buzzes and the shocking unit shocks the wrench to alert the user of the trip;

5. comparing the set/adjusted torque value of the mechanical torque mechanism of the wrench with the torque value detected by the electronic torque sensation mechanism to find whether the two torque values match each other:

the torque value detected by the torque sensor 60 of the electronic torque sensation mechanism (hereinafter referred to as electronic detected torque value) being displayed on the display panel 72, the set torque value of the mechanical torque mechanism of the wrench (the torque value indicated by the scale plate, hereinafter referred to as mechanical torque value) being compared with the electronic detected torque value, in case the mechanical torque value is different from the electronic detected torque value, for example, the electronic detected torque value is 2.7 N, while the set torque value of the mechanical structure is 3 N, then the procedure going back to step 2 to correct the torque value again, that is, the torque of the mechanical structure of the wrench being further adjusted according to the difference (0.3 N) between the electronic detected torque value and the mechanical torque value; and 6. completing the correction and turning off:

after correction steps 2 to 5, the mechanical torque value matching the electronic detected torque value and the torque correction process being completed, whereby the true torque value of the mechanical torque mechanism of the wrench is recovered, the electronic assembly 70 being powered off to end the correction process.

After adjusted, the mechanical torque value ranges from 0.96 time the electronic detected torque value (electronic torque value) to 1.04 times the electronic detected torque value in accordance with the required precision. Preferably, after adjusted, the mechanical torque value is 1.04 times the electronic detected torque value.

In the present invention, the electronic structure of the wrench serves to correct the torque value of the mechanical structure. The key point of the structural design of the present invention is that the trip mechanism 50 is positioned in the central line C of the flexible rod 25. That is, the two recesses 52, 54 and the abutment block 55 are all positioned in the central line C in alignment with each other. It is found through researches that only with the trip mechanism 50 positioned in the central line C of the flexible rod 25, the torque value detected by the sensor 60 is the true trip torque value of the wrench. In the case that the trip mechanism 50 is misaligned from the central line C of the flexible rod, then the torque value detected by the sensor 60 is not the true trip torque value of the wrench. In this case, the maximum error may even be a dozen percent.

Figure 11:
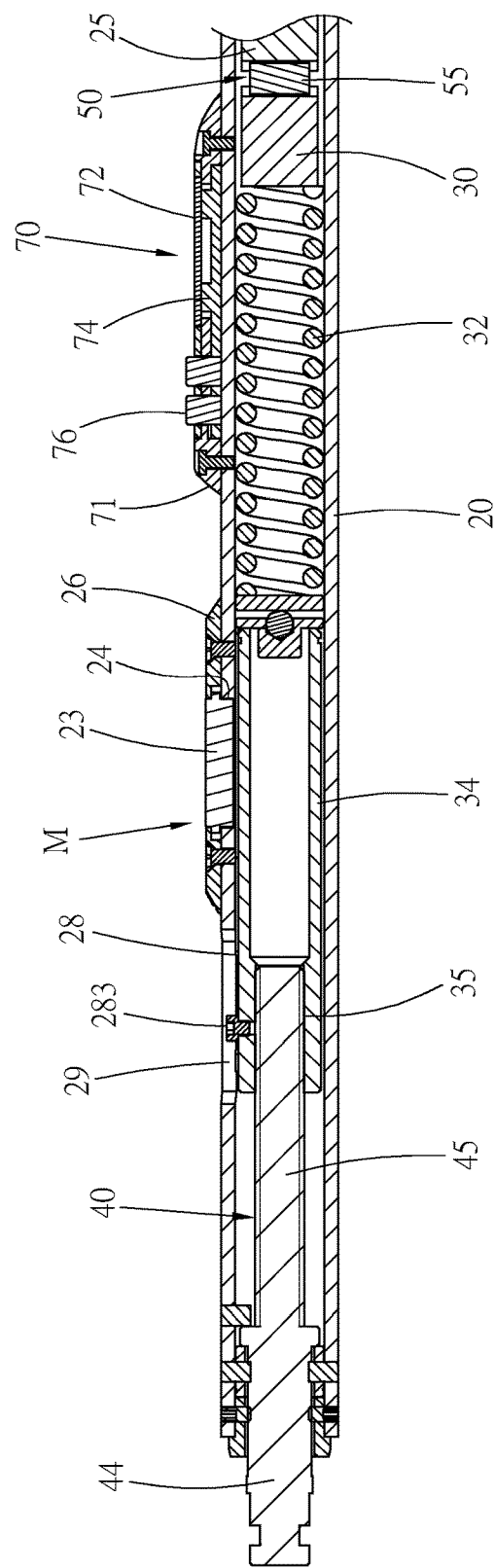
FIG. 11 is a sectional view of the first embodiment of the torque wrench of the present invention, showing that the torque value is corrected.

FIG. 11 shows the way to adjust the mechanical torque value of the mechanical torque mechanism of the wrench 10. The wear of the trip mechanism 50 will lead to weakening of the elastic energy of the elastic member 32. As a result, the torque value of the mechanical torque mechanism of the wrench is untrue. The purpose of the correction process is to adjust the elastic energy of the elastic member 32 that applies to the abutment member 30. A user moves the slide member 34 to get closer to the trip mechanism 50 so as to increase the elastic energy of the elastic member for compensating the error caused by decrease of the elastic energy resulting from the wear of the trip mechanism. In case of error, the scale of the scale plate 28 indicated by the indication mark 231 is incorrect, which means the mechanical torque value is incorrect. Therefore, it is necessary to adjust the position of the scale plate 28 on the slide member 34. Accordingly, in step 2, when it is desired to adjust the torque value, the handle 42 of the adjustment mechanism 40 is detached as shown in FIG. 11. At this time, a corrector can unscrew the small screw 283 to release the scale plate 28. Then, according to the electronic detected torque value, the scale plate 28 is moved rearward along the axial direction of the tubular body 20 to a true position and tightened, whereby the scale 281 of the scale plate 28 is positioned in a position where the true mechanical torque value is indicated. After the correction is completed, the torque value indicated by the scale plate matches the torque value detected by the torque sensor 60.

In this embodiment, the torque is corrected by means of adjusting the read value of the mechanical scale in the axial direction of the tubular body 20. After correction, the mechanical torque value matches the electronic sensation torque value.

Figure 12:
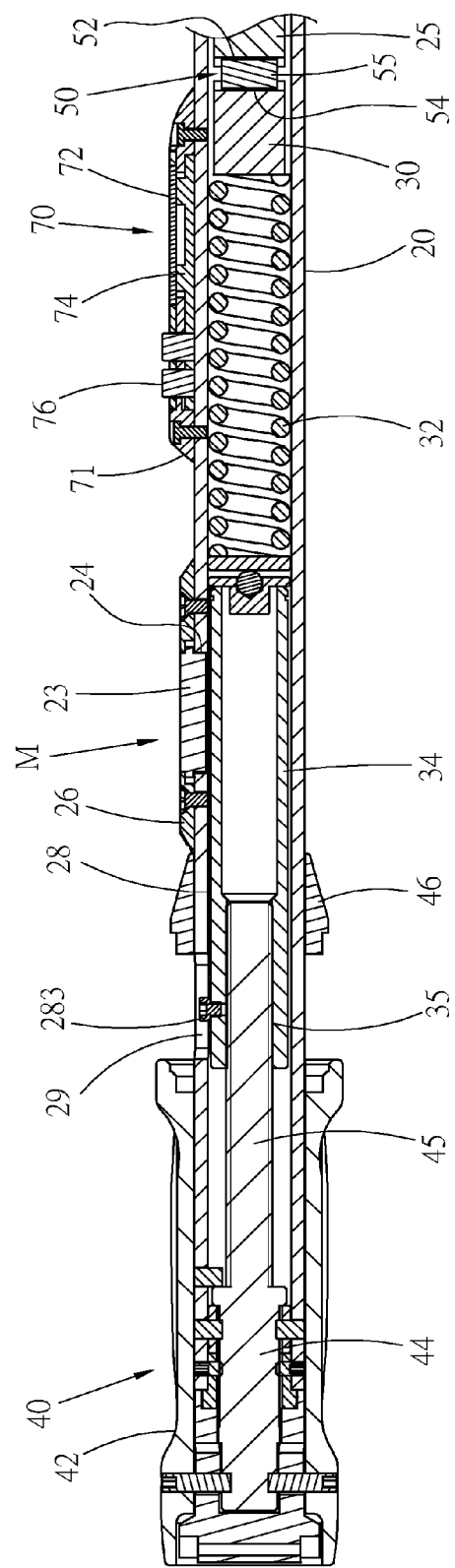
FIG. 12 is a sectional view of a part of a second embodiment of the wrench of the present invention.

FIG. 12 shows a second embodiment of the wrench 10 of the present invention, in which the same components are denoted with the same reference numerals of the first embodiment. In this embodiment, when performing step 2, the end collar 46 is separated from the handle 42 to expose the slot 29 and the small screw 283 to outer side for adjusting the position of the scale plate 28. After the scale plate 28 is adjusted to a true position, the end collar 46 is refitted with the front end of the handle 42 to shield the slot 29. In this case, when adjusting the torque value of the mechanical structure of the wrench, it is unnecessary to take off the handle 42.

It is easy to adjust the scale plate 28 so that a user himself/herself can perform the torque correction process without sending the wrench back to the manufacturer or retailer.

Figure 13:
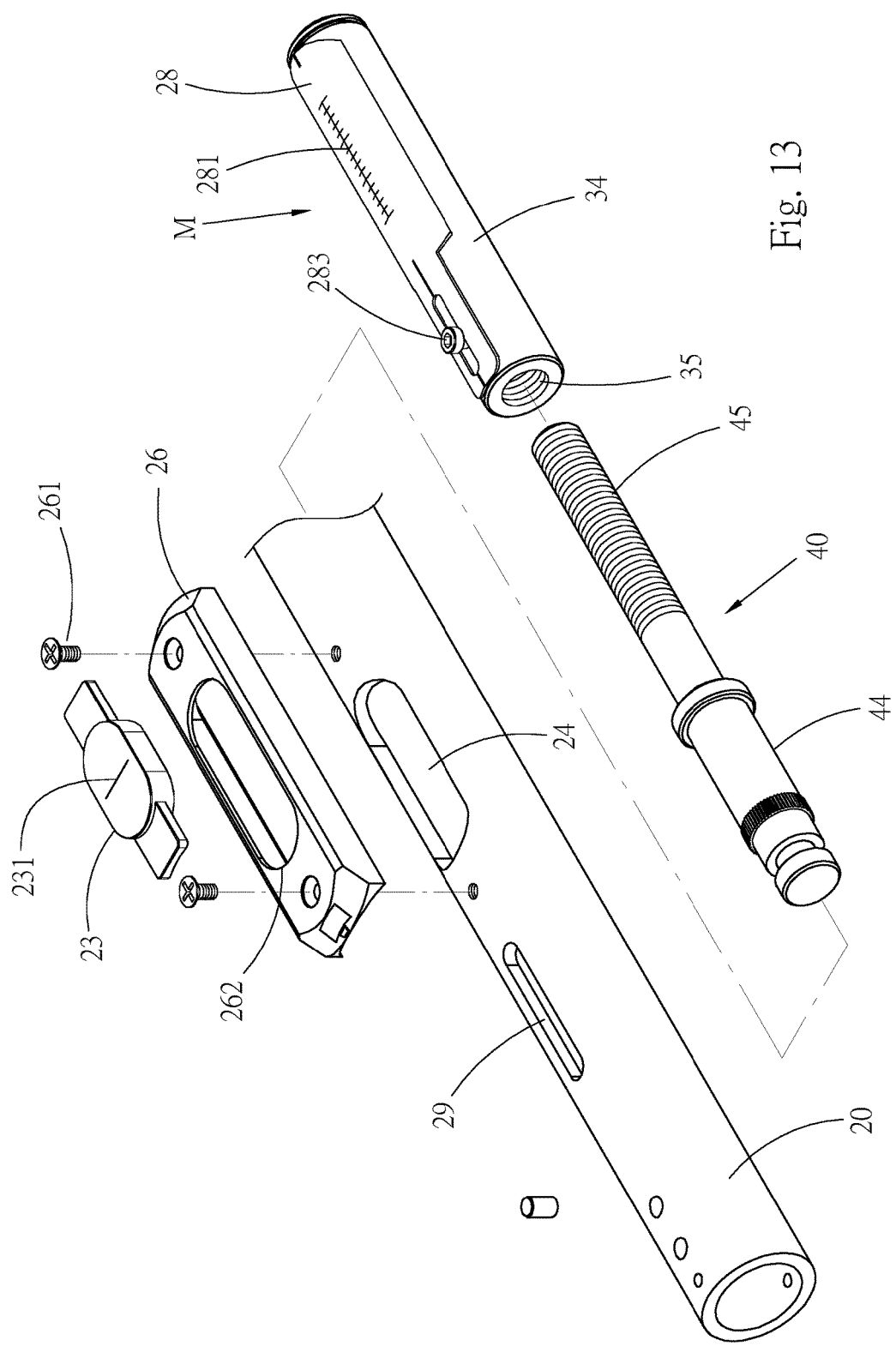
FIG. 13 is a partially perspective exploded view of a third embodiment of the wrench of the present invention.
Figure 14:
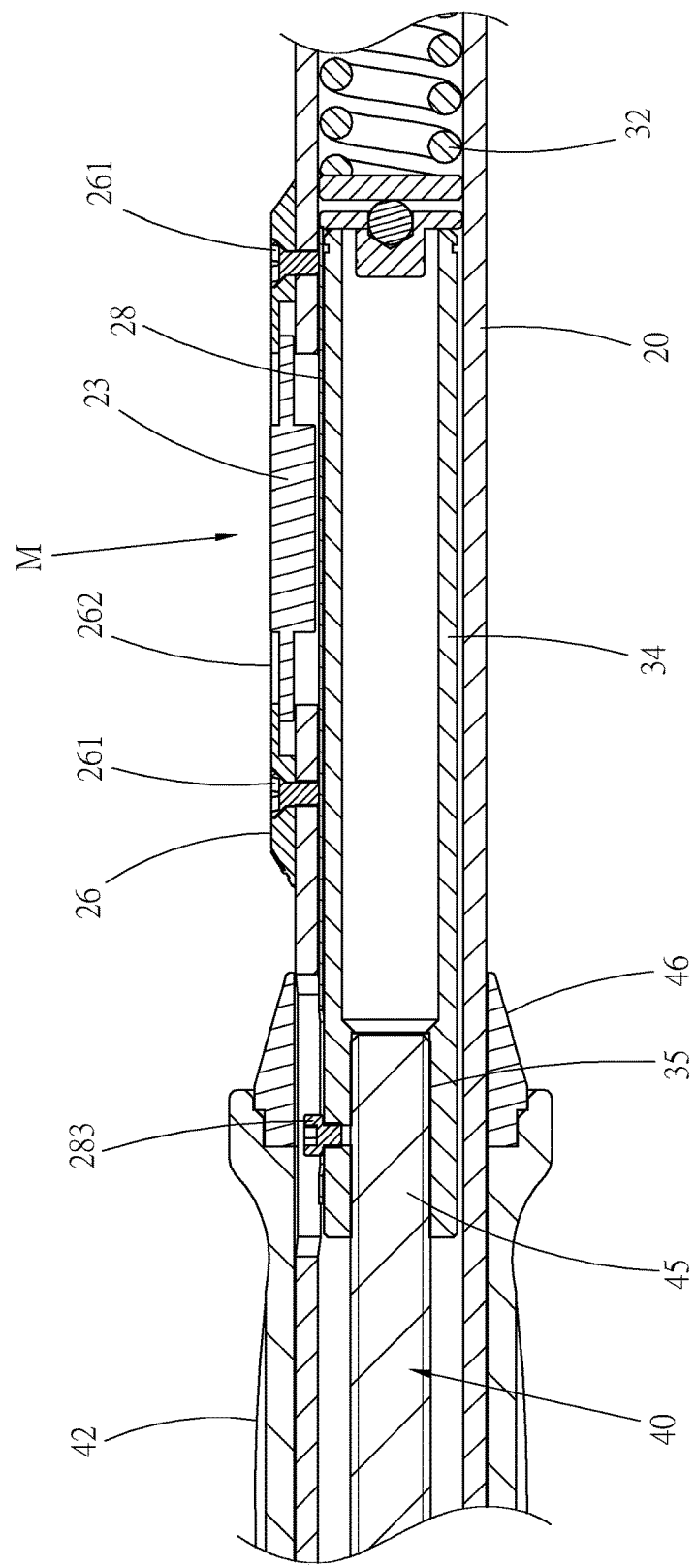
FIG. 14 is a partially longitudinally sectional view of the third embodiment of the wrench of the present invention.
Figure 15:
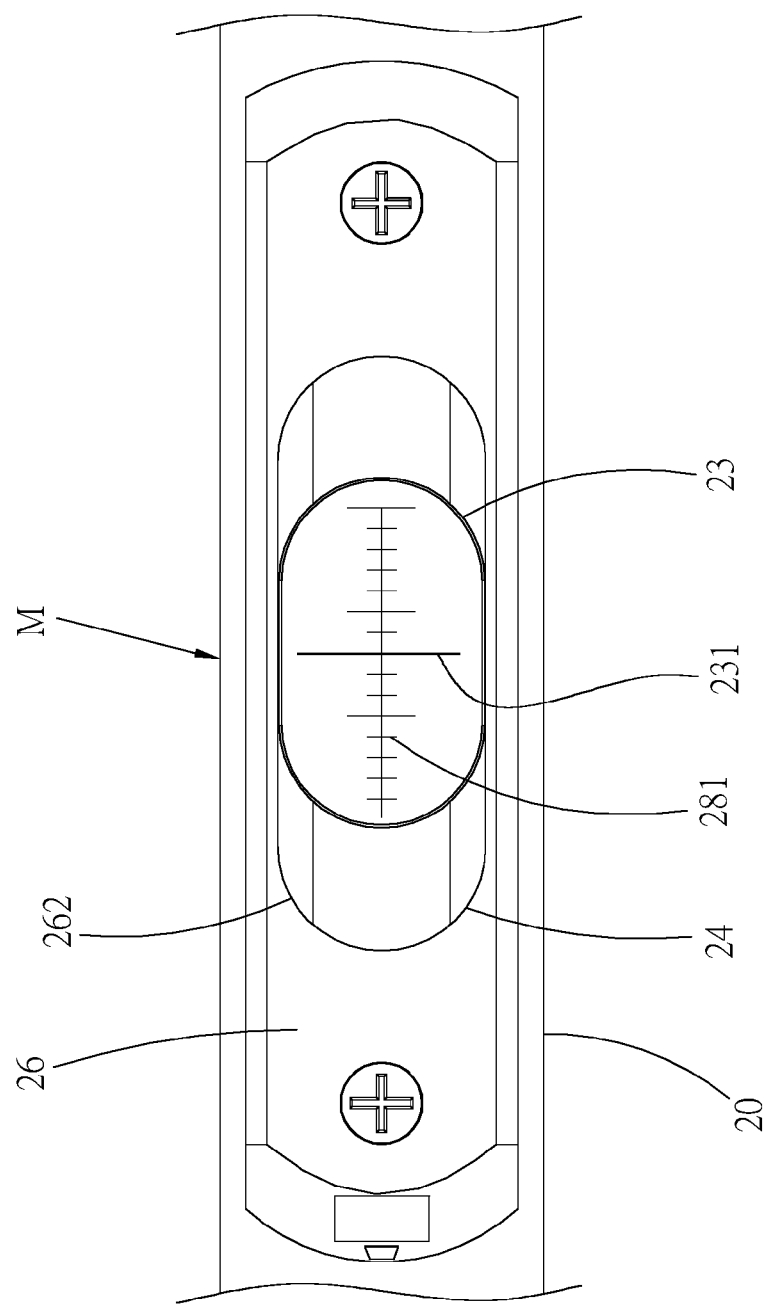
FIG. 15 is a partially top view of the third embodiment of the wrench of the present invention.

FIGS. 13 to 15 show a third embodiment of the wrench of the present invention. The same component is denoted with the same reference numeral. In this embodiment, the indicator 23 is slidable within the window 24 in the axial direction of the tubular body 20. When the cover body 26 is secured by the two small screws 261, the cover body 26 is tightly pressed against the indicator 23 to hinder the indicator 23 from moving. The scale plate 28 is fixed on the slide member 34 by screws, whereby the scales 281 are positioned on the surface of the slide member 34. It should be noted that the scale plate 28 can be alternatively directly made on the surface of the slide member. In this case, the scale plate 28 can be saved. The indication mark 231 and the scales 281 can be seen through the perforation 262 of the cover body 26.

In this embodiment, the manner in which the torque value is corrected is identical to the first embodiment and thus will not be repeatedly described hereinafter. In case the mechanical torque value has an error, that is, the value of the scale 281 indicated by the indication mark 231 is incorrect, a corrector can first unscrew the two small screws 261 to make the cover body 26 no longer press the indicator 23. Then, the indicator 23 is moved in the axial direction of the tubular body 20 to make the indication mark 231 on the indicator indicate a correct value of the scale 281. After the mechanical torque value is corrected, the cover body 26 is screwed and tightened again to fix the indicator 23 and complete the torque correction process. Accordingly, the read value of the torque scale of the mechanical torque mechanism can be adjusted in the longitudinal direction of the tubular body.

In addition, the corrector can move the indicator 23 and the scale plate 28 to adjust the read value of the mechanical scale.

Figure 16:
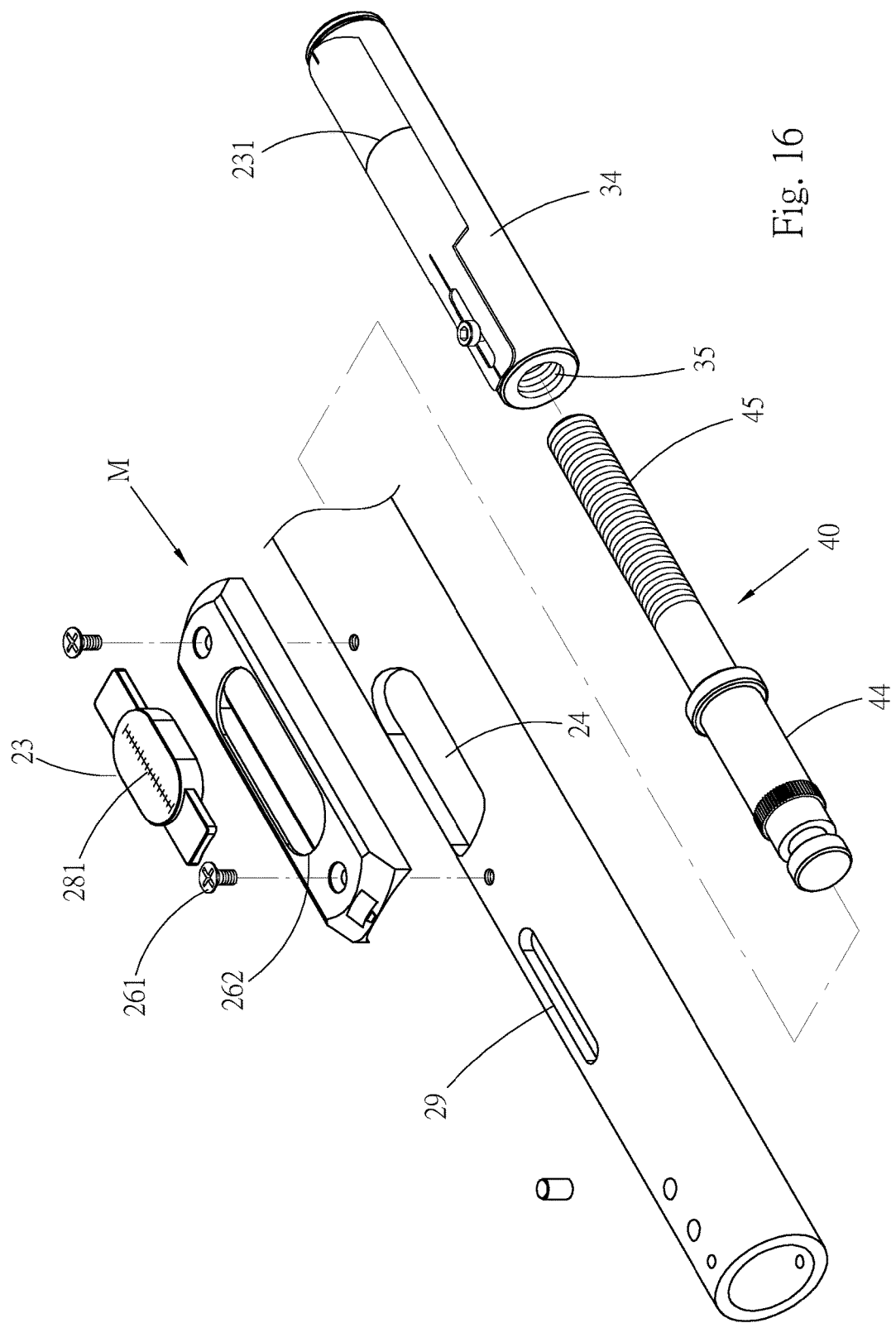
FIG. 16 is a partially perspective exploded view of a fourth embodiment of the wrench of the present invention.

FIG. 16 is a partially perspective exploded view of a fourth embodiment of the wrench of the present invention. The fourth embodiment is substantially identical to the third embodiment in structure. The fourth embodiment is different from the third embodiment in that the scales 281 are disposed on the indicator 23, while the indication mark 231 is made on the surface of the slide member 34. In case it is found that the mechanical torque value has an error when correcting the torque value, the mechanical torque value can be restored to the correct value in such a manner that the cover body 26 is first loosened to no longer press the indicator 23. Then, the indicator 23 is moved in the axial direction of the tubular body 20 to align the correct value of the scale 281 on the indicator with the indication mark 231 of the slide member. Then the cover body 26 is tightened to fix the indicator 23. Under such circumstance, the mechanical torque value is corrected into a correct value to complete the torque correction process.

Figure 17:
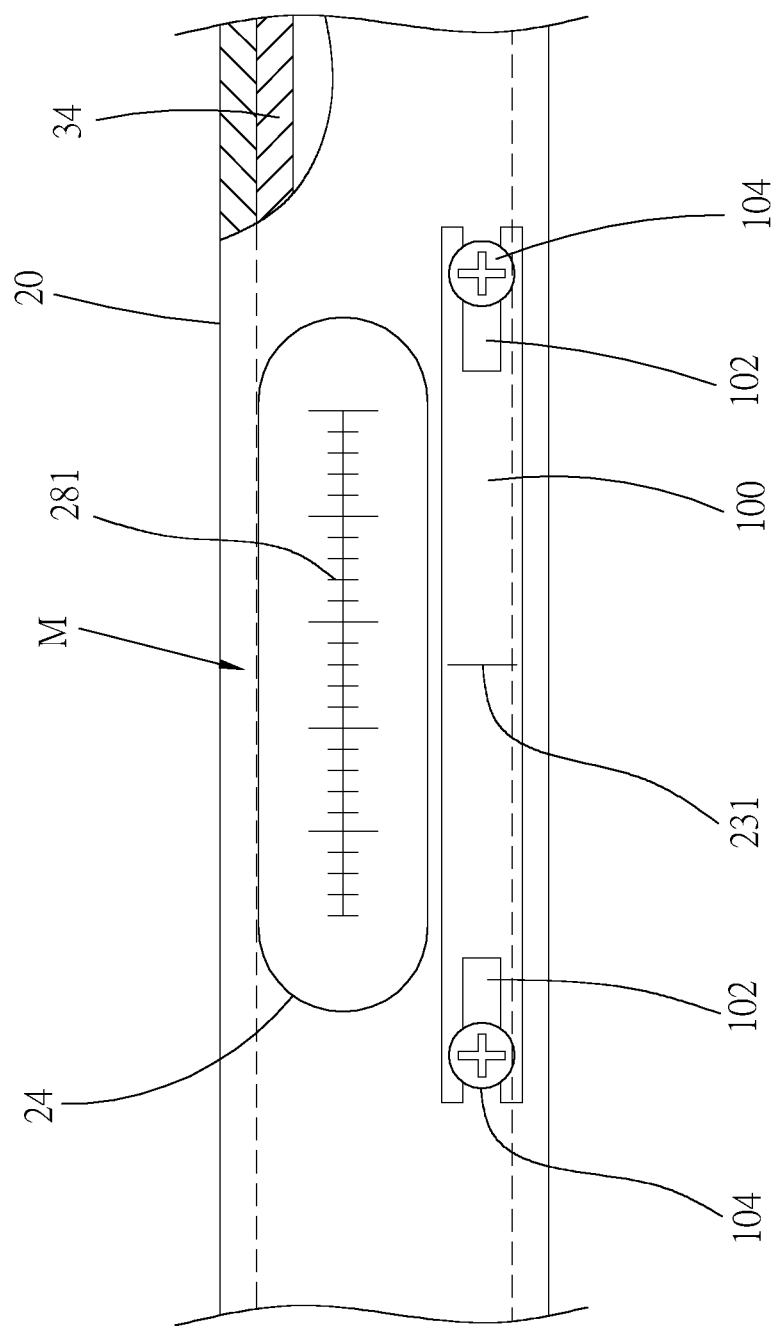
FIG. 17 is a partially top view of a fifth embodiment of the wrench of the present invention.

FIG. 17 is a partially top view of a fifth embodiment of the wrench of the present invention. In the fifth embodiment, the scales 281 are disposed on the surface of the slide member 34 and exposed to outer side through the window 24 of the tubular body 20. The fifth embodiment further includes an indicator 100. The indicator 100 is mounted on the circumference of the tubular body 20 and positioned on one side of the window 24. The indicator 100 is movable in the axial direction of the tubular body. Two ends of the indicator 100 are respectively formed with two notches 102. Two small screws 104 are used to secure the two ends of the indicator on the tubular body 20 from the two notches 102. The indication mark 231 is disposed on the indicator 100.

In case the mechanical torque value has an error, the mechanical torque value can be restored to the correct value in such a manner that the two small screws 104 are first unscrewed and then the indicator 100 is moved to point the indication mark 231 at the correct value of the scale 281. Then the two small screws 104 are again screwed to secure the indicator 100. Under such circumstance, the mechanical torque value is corrected into a correct value. It should be noted that the scales 281 and the indication mark 231 can be switched in position. That is, the scales 281 can be disposed on the indicator 100, while the indication mark 231 can be disposed on the slide member 34. This can achieve the same effect.

FIG. 18 shows a sixth embodiment of the wrench of the present invention, in which the same components are denoted with the same reference numerals of the first embodiment. This embodiment provides another type of trip mechanism 50. The trip mechanism 50 includes a roller member 90 (ball or roller) and two circular rods 91, 92 respectively positioned at the front end of the abutment member 30 and the rear end of the flexible rod 25. The roller member 90 is in contact with the two circular rods 91, 92. Similarly, the trip mechanism 50 is positioned in the central line C of the flexible rod 25, whereby the torque value detected by the sensor 60 is the true torque value of the trip mechanism 50. That is, the two circular rods 91, 92 are symmetrically positioned on two sides of the central line C and the roller member 90 is positioned in the central line C.

FIG. 19 shows a seventh embodiment of the wrench of the present invention. This embodiment provides still another type of trip mechanism 50. The trip mechanism 50 includes a roller member 90 (ball or roller) and an arched recess 94 respectively disposed at the front end of the abutment member 30 and the rear end of the flexible rod 25. The roller member 90 is in contact with the arched recess 94. Similarly, the trip mechanism 50 is positioned in the central line C of the flexible rod 25. That is, the roller member 90 and the arched recess 94 are both positioned in the central line C.

Figure 20:
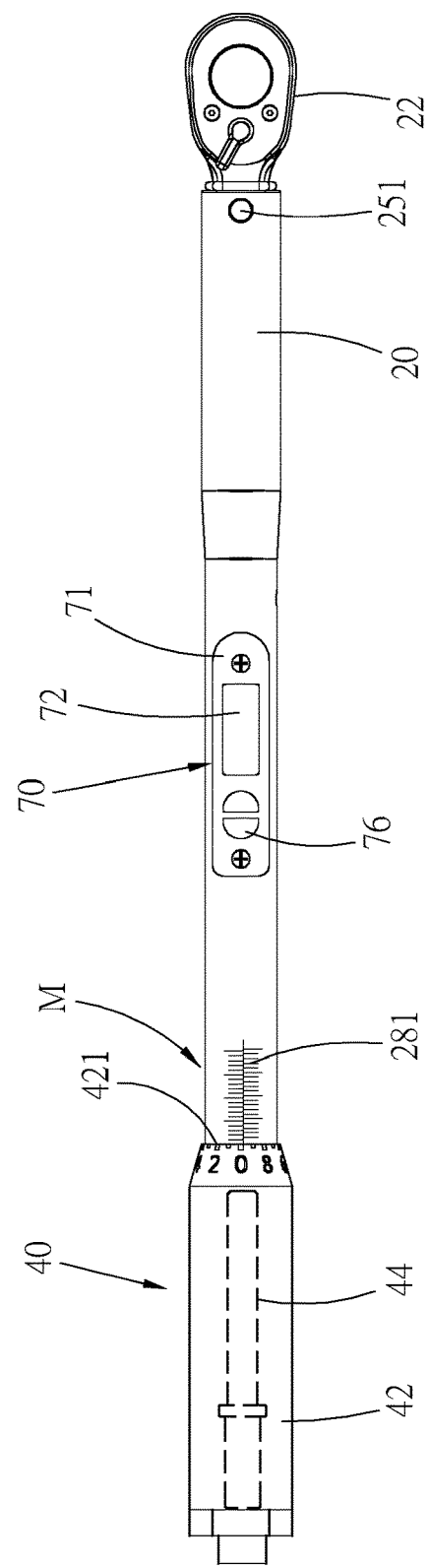
FIG. 20 is a top view of an eighth embodiment of the torque wrench of the present invention.

FIG. 20 is a top view of an eighth embodiment of the wrench of the present invention, the torque wrench has both a mechanical torque mechanism and an electronic torque sensation mechanism.

This embodiment is free from the scale plate. The tubular body is free from the window. The circumference of the tubular body 20 is marked with scales 281. The adjustment member 44 of the adjustment mechanism 40 is screwed in the tubular body 20. The front end of the adjustment member 44 abuts against a slide member or the elastic member. The handle 42 is connected with the adjustment member 44 in such a manner that the relative positions of the handle 42 and the adjustment member 44 in the axial direction of the tubular body 20 are adjustable. By means of rotating the handle 42, the torque value of the wrench 10 is adjustable. The adjustment member 44 and the handle 42 are together moved in the axial direction of the tubular body to change the elastic energy of the elastic member. The front end edge 421 of the handle 42 and the scales 281 form mechanical torque display assembly M. The value indicated by the front end edge 421 is exactly the set torque value of the wrench. In case of error of the torque value of the mechanism torque mechanism of the wrench 10, similarly, the aforesaid correction process is performed. A user disconnects the handle 42 from the adjustment member 44 and adjusts the handle 42 to a true position according to the torque value detected by the electronic torque sensation mechanism, whereby the front end edge 421 is positioned at a correct scale. Finally, the handle 42 and the adjustment member 44 are reconnected to complete the torque correction process. In this embodiment, when performing the correction process, the torque is corrected by means of adjusting the position of the handle 42 located in longitudinal direction of the tubular body 20, the relative positions of the handle 42 and the adjustment member 44 are changed to position the front end edge 421 of the handle 42 at the true scale. Accordingly, in this embodiment, the torque is corrected by means of adjusting the read value of the mechanical scale in the longitudinal direction of the tubular body 20, so that the mechanical torque value matches the electronic sensation torque value.

The mechanical structure of the wrench is sensible and perceptible and which in the present invention is the structure for a user to operate the wrench. In case of wear of the trip mechanism of the wrench, the inaccuracy of the trip mechanism can be corrected by the electronic components of the wrench. The electronic components of the wrench can precisely detect the true torque value to eliminate the error of the mechanical structure and recover the true torque value of the mechanical structure. Moreover, the present invention is such designed that a user himself/herself can perform the torque correction process.

Moreover, in a dim or dark site, the wrench can be selectively operated with the electronic torque sensation mechanism. An operator can read the torque value of the wrench through the electronic display unit.

The above embodiments are only used to illustrate the present invention, not intended to limit the scope thereof. Many modifications of the above embodiments can be made without departing from the spirit of the present invention. For example, the trip mechanism and the adjustment structure of the wrench can have other forms.

What is claimed is:

1. A torque-correctable torque wrench comprising:
a tubular body;
an operation head positioned at a front end of the tubular body;
a mechanical torque mechanism disposed on the tubular body, the mechanical torque mechanism having a mechanical torque display assembly, the mechanical torque display assembly serving to show the mechanical torque value of the torque wrench by means of scales and indication mark; and
an electronic torque sensation mechanism disposed on the tubular body, the electronic torque sensation mechanism having an electronic display screen for showing the electronic torque value of the torque wrench, the read values of the scales of the mechanical torque display assembly being adjustable in a longitudinal direction of the tubular body.

2. The torque wrench as claimed in claim 1, wherein a window is disposed on a circumference of the tubular body, the mechanical torque mechanism including an adjustment mechanism and a tripping mechanism, the tripping mechanism being connected with the operation head, the adjustment mechanism including a slide member and an elastic member, the slide member being disposed in the tubular body and movable within the tubular body to adjust the elastic energy of the elastic member, the adjustment mechanism serving to elastically apply pressure to the tripping mechanism, an indicator being disposed on the circumference of the tubular body, the position of the indicator on the tubular body being adjustable in a longitudinal direction of the tubular body, the mechanical torque display assembly further including an indication mark and scales respectively disposed on the slide member and the indicator, the indication mark and scales serving to indicate the mechanical torque value through the window.

3. The torque wrench as claimed in claim 2, wherein the indicator is disposed in the window and adjustable in position within the window in the longitudinal direction of the tubular body.

4. The torque wrench as claimed in claim 3, wherein the indicator is slidable within the window, the torque wrench further comprising a cover body detachably disposed on the circumference of the tubular body, the indicator being located by the cover body.

5. The torque wrench as claimed in claim 2, wherein the indicator is positioned on one side of the window.

6. The torque wrench as claimed in claim 1, wherein:
a window is disposed on a circumference of the tubular body;
the mechanical torque mechanism including an adjustment mechanism and a tripping mechanism, the tripping mechanism being connected with the operation head;
the adjustment mechanism including a slide member and an elastic member, the slide member being disposed in the tubular body and movable within the tubular body to adjust the elastic energy of the elastic member, the adjustment mechanism serving to elastically apply pressure to the tripping mechanism;
an indicator being disposed on the circumference of the tubular body;
a scale member being disposed on a surface of the slide member, the position of the scale member on the slide member being adjustable in a longitudinal direction of the tubular body; and
the mechanical torque display assembly further including an indication mark and scales respectively disposed on the scale member and the indicator, the indication mark and scales serving to indicate the mechanical torque value through the window.

7. The torque wrench as claimed in claim 6, wherein the indicator is disposed in the window.

8. The torque wrench as claimed in claim 7 wherein the position of the indicator is adjustable in the window in the longitudinal direction of the tubular body.

9. The torque wrench as claimed in claim 1, wherein scales are disposed on outer circumference of the tubular body, the adjustment mechanism including a handle and an adjustment member, the adjustment member being disposed in the tubular body, the handle being fitted with rear end of the tubular body, the handle being connected with the adjustment member in such a manner that the relative position between the handle and the adjustment member is adjustable in an axial direction of the tubular body, a front end edge of the handle being positioned at the scales, whereby when rotating the handle, the handle and the adjustment member are displaced in the longitudinal direction of the tubular body.

10. A torque correction method of the torque-correctable torque wrench as claimed in claim 1, wherein the wrench has the mechanical torque mechanism and the electronic torque sensation mechanism, the correction method comprising steps of:
applying a torque with the torque-correctable torque wrench; and
correcting the read value of the scale of the mechanical torque display assembly of the mechanical torque mechanism by adjusting the mechanical torque value to match the electronic torque value so as to correct any error.

11. The torque correction method as claimed in claim 10, wherein:
a window is disposed on a circumference of the tubular body; the mechanical torque mechanism including an adjustment mechanism, the adjustment mechanism having a slide member, the adjustment mechanism being able to drive the slide member to move in a longitudinal direction of the tubular body;
an indicator being disposed on the circumference of the tubular body and movable in the longitudinal direction of the tubular body;
the mechanical torque display assembly including an indication mark and scales respectively disposed on the slide member and the indicator, the indication mark and scales serving to indicate the mechanical torque value through the window; and
in the step of correcting the read value of the scale, the position of the indicator on the tubular body is adjusted.

12. The torque correction method as claimed in claim 10, wherein:
a window is disposed on a circumference of the tubular body; the mechanical torque mechanism including an adjustment mechanism, the adjustment mechanism having a slide member, the adjustment mechanism being able to drive the slide member to move in a longitudinal direction of the tubular body;

a scale member being disposed on a surface of the slide member, the position of the scale member on the slide member being adjustable in the longitudinal direction of the tubular body;

the mechanical torque display assembly including an indication mark and scales respectively disposed on the slide member and the indicator, the indication mark and scales serving to indicate the mechanical torque value through the window; and in the step of correcting the read value of the scale, the position of the indicator on the tubular body is adjusted.

13. The torque correction method as claimed in claim 10, wherein:

the mechanical torque mechanism includes an adjustment mechanism, the adjustment mechanism including a handle and an adjustment member, the adjustment member being disposed in the tubular body, the handle being fitted with rear end of the tubular body, the handle being connected with the adjustment member in such a manner that the relative position between the handle and the adjustment member is adjustable, whereby when rotating the handle, the handle and the adjustment member are displaced in the longitudinal direction of the tubular body; and in the step of correcting the read value of the scale, the relative position between the handle and the adjustment member is adjusted in the longitudinal direction of the tubular body.

* * * * *